United States Patent
Nishikawa

(10) Patent No.: US 12,185,394 B2
(45) Date of Patent: Dec. 31, 2024

(54) COMMUNICATION APPARATUS AND COMMUNICATION METHOD

(71) Applicant: SONY GROUP CORPORATION, Tokyo (JP)

(72) Inventor: Kenzoh Nishikawa, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 482 days.

(21) Appl. No.: 17/593,096

(22) PCT Filed: Feb. 10, 2020

(86) PCT No.: PCT/JP2020/005055
§ 371 (c)(1),
(2) Date: Sep. 9, 2021

(87) PCT Pub. No.: WO2020/195242
PCT Pub. Date: Oct. 1, 2020

(65) Prior Publication Data
US 2022/0150996 A1 May 12, 2022

(30) Foreign Application Priority Data
Mar. 26, 2019 (JP) .................. 2019-058419

(51) Int. Cl.
*H04W 76/12* (2018.01)
*H04W 84/12* (2009.01)
*H04W 88/04* (2009.01)

(52) U.S. Cl.
CPC .......... *H04W 76/12* (2018.02); *H04W 84/12* (2013.01); *H04W 88/04* (2013.01)

(58) Field of Classification Search
CPC ..... H04W 76/12; H04W 84/12; H04W 88/04; H04W 12/06; H04W 4/70; H04W 4/50;
(Continued)

(56) References Cited

U.S. PATENT DOCUMENTS

| | | | |
|---|---|---|---|
| 2013/0173811 A1* | 7/2013 | Ha | H04W 12/50 709/227 |
| 2015/0016417 A1* | 1/2015 | Dees | H04W 88/08 370/331 |
| 2020/0015149 A1* | 1/2020 | Jheng-Hao | H04W 12/069 |

FOREIGN PATENT DOCUMENTS

| | | |
|---|---|---|
| JP | 2013-247533 A | 12/2013 |
| JP | 2014-183481 A | 9/2014 |

(Continued)

OTHER PUBLICATIONS

International Search Report and Written Opinion of PCT Application No. PCT/JP2020/005055, issued on May 12, 2020, 11 pages of ISRWO.

*Primary Examiner* — Nimesh Patel
(74) *Attorney, Agent, or Firm* — CHIP LAW GROUP

(57) ABSTRACT

A communication apparatus for connecting to the Internet without using an input/output apparatus is provided. The communication apparatus includes: a first connecting unit configured to connect to a first device; an acquiring unit configured to acquire, via the first device, setup information for connecting to a second device that operates as a router; and a second connecting unit configured to connect to the second device based on the setup information. A code sequence is generated using a code generator that is in common with the first device from an initial value that is shared with the first device. In addition, network identification information extracted from a signal received from the first device is searched for in the code sequence, and network authentication information is segmented from a predetermined offset position using a matching location as a reference.

12 Claims, 14 Drawing Sheets

(58) Field of Classification Search
CPC ..... H04W 12/35; H04W 76/27; H04W 72/53; H04W 92/18; H04W 76/19; H04W 74/006; H04W 72/535; H04W 76/11; H04W 72/02; H04W 72/20; H04W 76/18; H04W 76/20; H04W 76/14; H04W 24/04; H04W 36/08; H04W 36/30; H04W 76/15; H04W 88/02; H04W 88/08; H04W 36/22; H04W 36/0061; H04W 36/0085; H04W 16/00; H04W 16/02; H04W 48/20; H04B 17/318; H04B 7/088; H04B 7/0695; H04B 7/0617; H04B 7/0413; H04B 7/0404; H04B 17/328; H04B 7/0452

See application file for complete search history.

(56) References Cited

FOREIGN PATENT DOCUMENTS

| | | | |
|---|---|---|---|
| JP | 2015-103990 | * | 6/2015 |
| JP | 2015-103990 A | | 6/2015 |
| JP | 2015-162826 A | | 9/2015 |

* cited by examiner

COMMUNICATION APPARATUS AND COMMUNICATION METHOD

CROSS REFERENCE TO RELATED APPLICATIONS

This application is a U.S. National Phase of International Patent Application No. PCT/JP2020/005055 filed on Feb. 10, 2020, which claims priority benefit of Japanese Patent Application No. JP 2019-058419 filed in the Japan Patent Office on Mar. 26, 2019. Each of the above-referenced applications is hereby incorporated herein by reference in its entirety.

TECHNICAL FIELD

The technique disclosed in the present specification relates to a communication apparatus and a communication method for connecting to the Internet.

BACKGROUND ART

Autonomous sensors, autonomous robots, and IoT (Internet of Things) devices of various types have become widely used. An IoT device is, literally, a device premised on connecting to the cloud via the Internet. Therefore, at the start of use, an Internet connection setup must be first performed. Specifically, an Internet connection setup as described herein refers to a setup for connecting an IoT device to a router. In the present specification, particularly, a case will be discussed where wireless LAN (Local Area Network) technology such as Wi-Fi (registered trademark) is used to connect an IoT device to a nearest Wi-Fi router. However, given that many IoT devices are products that are not equipped with an input/output apparatus, the present applicants consider the manner in which an Internet connection setup is performed to be a problem.

For example, in order to enable a wireless LAN setup to be readily performed, a standard known as Wi-Fi Protected Setup (WPS) has been defined and put to practical use by the Wi-Fi Alliance. The PBC (Push Button Configuration) scheme is known as a wireless connection scheme of WPS. In the PBC scheme, simultaneously pressing buttons respectively mounted to an access point and a wireless handset (STA) enables the access point to detect the STA of which the button had been pressed and automatically set up the STA (for example, refer to PTL 1). However, it is often difficult to equip an IoT device with a button for PBC.

CITATION LIST

Patent Literature

[PTL 1]
JP 2015-162826A

SUMMARY

Technical Problem

An object of the technique disclosed in the present specification is to provide a communication apparatus and a communication method for connecting to the Internet and a communication apparatus and a communication method to perform processing related to an Internet connection of a device.

Solution to Problem

The technique disclosed in the present specification has been devised in consideration of the problem described above, and a first aspect thereof is a communication apparatus including:
- a first connecting unit configured to connect to a first device;
- an acquiring unit configured to acquire, via the first device, setup information for connecting to a second device that operates as a router; and
- a second connecting unit configured to connect to the second device based on the setup information.

The first device temporarily operates as an access point. In addition, the first connecting unit performs a connection request with respect to the access point as a terminal and connects to the first device.

The communication apparatus according to the first aspect includes the code sequence generator that is in common with the first device, and the code sequence generator generates the code sequence based on the initial value that is shared with the first device. Network identification information extracted from a signal received from the first device is searched for in the code sequence, network authentication information is segmented from a predetermined offset position using a matching location as a reference, and connection to the first device is attempted.

In addition, a second aspect of the technique disclosed in the present specification is a communication method including:
- a first connection step of connecting to a first device;
- a step of acquiring, via the first device, setup information for connecting to a second device that operates as a router; and
- a second connection step of connecting to the second device based on the setup information.

Furthermore, a third aspect of the technique disclosed in the present specification is
a communication apparatus including:
- a generating unit configured to segment network identification information and network authentication information from a code sequence generated from a predetermined initial value using a predetermined code sequence generator;
- a transmitting unit configured to transmit a signal including the network identification information to a fourth device; and
- a connecting unit configured to connect to the fourth device in response to a connection request based on the network authentication information from the fourth device.

Moreover, a fourth aspect of the technique disclosed in the present specification is a communication method including:
- a generation step of segmenting network identification information and network authentication information from a code sequence generated from a predetermined initial value using a predetermined code sequence generator;
- a transmission step of transmitting a signal including the network identification information to a fourth device; and
- a connection step of connecting to the fourth device in response to a connection request based on the network authentication information from the fourth device.

Advantageous Effects of Invention

The technique disclosed in the present specification is capable of providing a communication apparatus and a communication method for connecting to the Internet without using an input/output apparatus and a communication apparatus and a communication method to perform processing related to an Internet connection of a device that does not have an input/output apparatus.

It should be noted that the advantageous effects described in the present specification are merely exemplary and that the advantageous effects produced by the technique disclosed in the present specification are not limited thereto. In addition, the technique disclosed in the present specification may further exhibit attendant advantageous effects in addition to the advantageous effects described above.

Other objects, features, and advantages of the technique disclosed in the present specification will become better understood upon consideration of the following detailed description in conjunction with the embodiment to be described later and the accompanying drawings.

DESCRIPTION OF EMBODIMENTS

Hereinafter, an embodiment of the technique disclosed in the present specification will be described in detail with reference to the accompanying drawings.

First Example

A processing procedure for performing an Internet connection setup of an IoT device which is assumed in a first example will be described with reference to FIGS. 1 to 3. An Internet connection setup as described herein refers to a setup for wirelessly connecting an IoT device to a nearest Wi-Fi router. The processing procedure for an Internet connection setup is made up of the following three stages.

Stage 1: Connecting an IoT device to a time-limited access point (refer to FIG. 1)

Stage 2: Performing an Internet connection setup from the cloud to the IoT device (refer to FIG. 2)

Stage 3: Connecting the IoT device to a Wi-Fi router based on setup contents (refer to FIG. 3)

Figure 1:
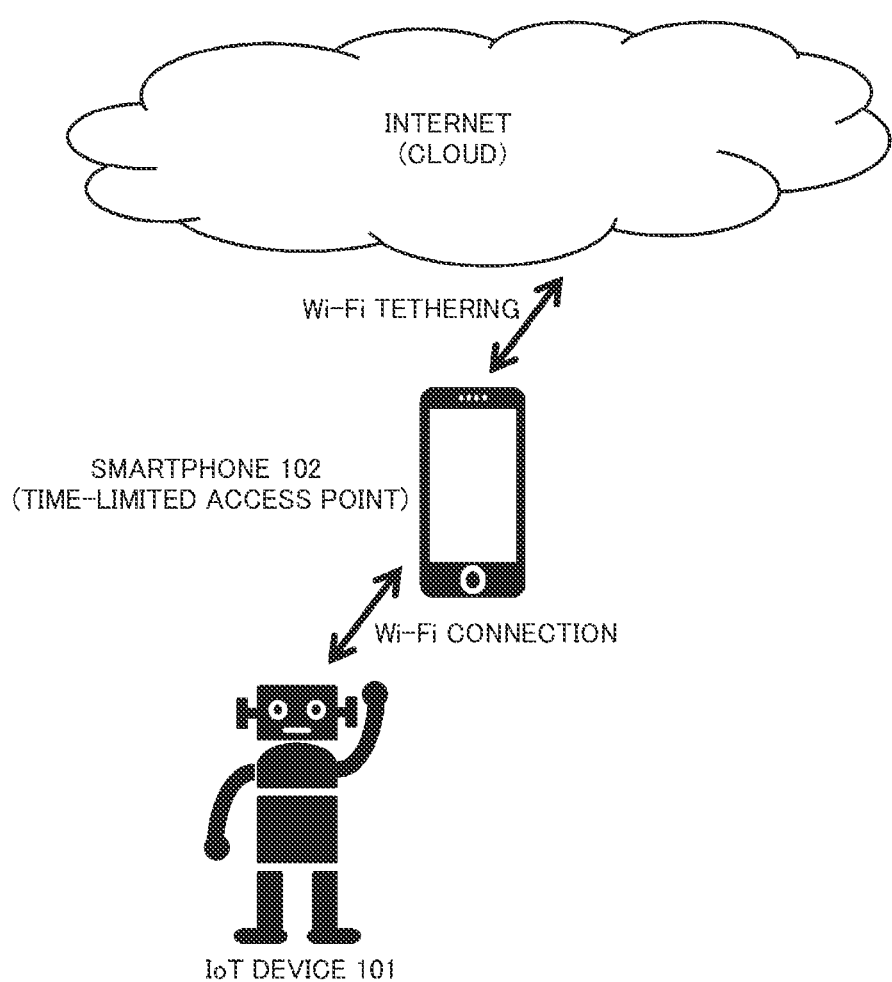
FIG. 1 is a diagram showing a processing procedure for performing an Internet connection setup of an IoT device.

First, as shown in FIG. 1, a Wi-Fi tethering function of a multifunctional information terminal (hereinafter, unified to "smartphone") 102 that is a smartphone, a tablet, or the like is started to make the smartphone a time-limited access point. Processing by the smartphone to start or stop Wi-Fi tethering can be performed using, for example, a dedicated smartphone application. In addition, an IoT device 101 establishes a Wi-Fi connection to the smartphone 102. As a result, the IoT device 101 can obtain a connection path to the Internet in a time-limited manner. Details of the processing procedure to establish a Wi-Fi connection between the IoT device 101 and the smartphone 102 running the Wi-Fi tethering function will be described later.

Figure 2:
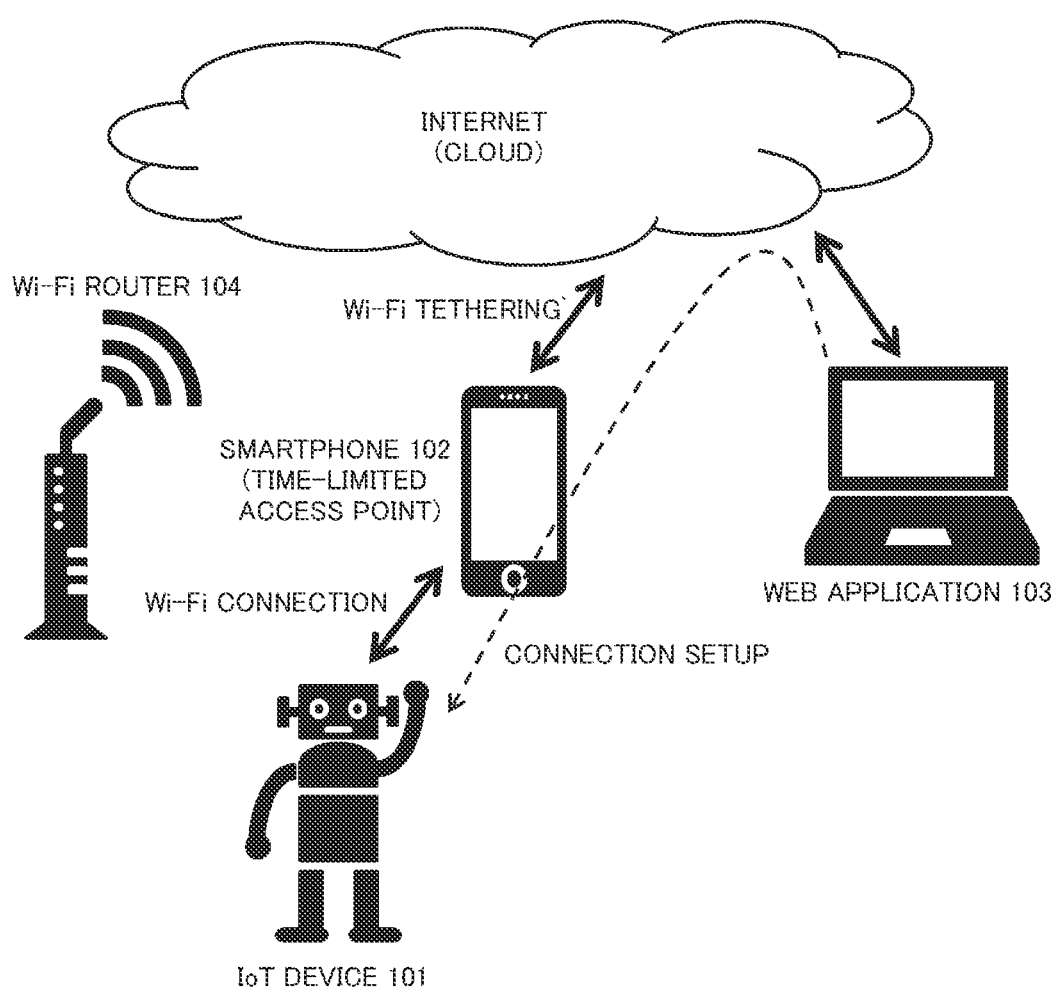
FIG. 2 is a diagram showing a processing procedure for performing an Internet connection setup of an IoT device.

In this manner, as shown in FIG. 2, the IoT device 101 enters a state where mutual communication can be performed with a personal computer being connected to the Internet. Subsequently, with respect to the IoT device 101, a Web application 103 running on the personal computer performs setup of setup information that is information necessary to establish a Wi-Fi connection to a Wi-Fi router 104. In this case, the setup information that is necessary to establish a Wi-Fi connection can include network identification information such as an SSID (Service Set IDentifier) and network authentication information that is constituted by a passphrase such as WEP (Wired Equivalent Privacy), WPA (Wi-Fi Protected Access), or WPA2.

Figure 3:
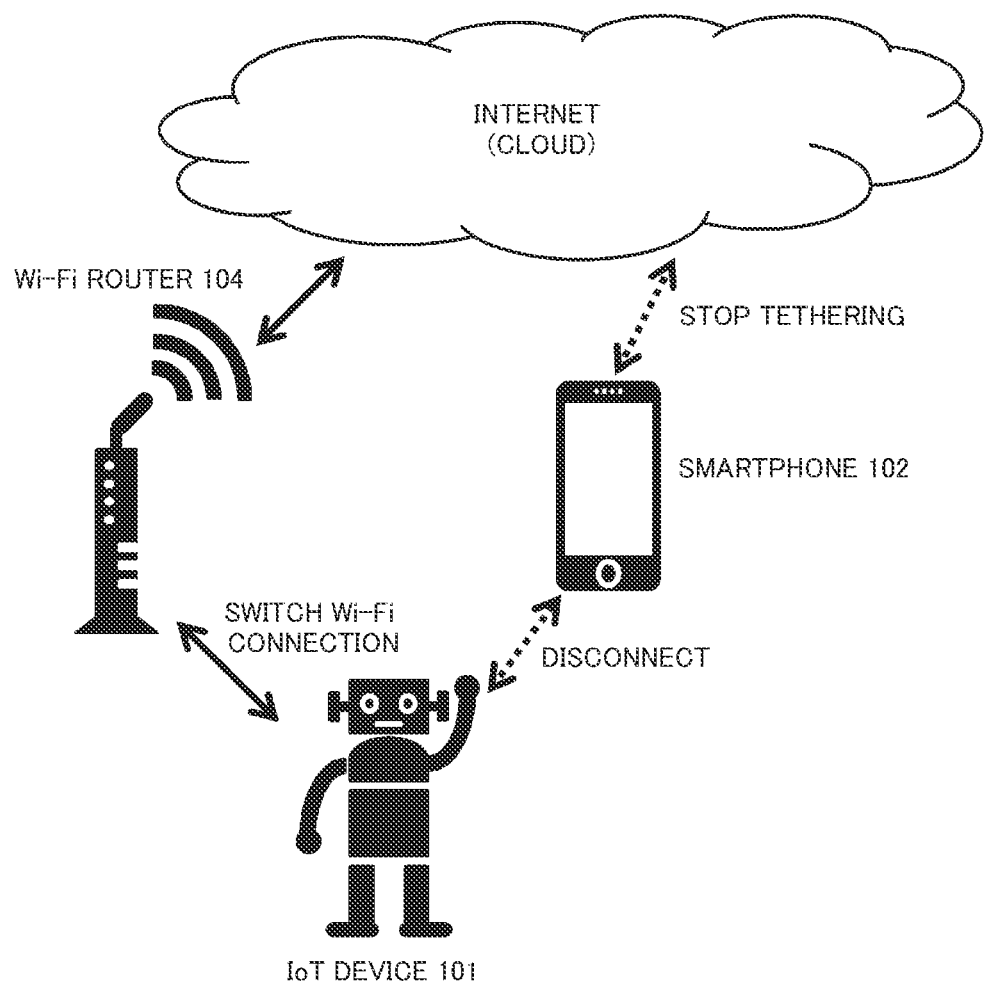
FIG. 3 is a diagram showing a processing procedure for performing an Internet connection setup of an IoT device.

In addition, as shown in FIG. 3, the IoT device 101 establishes a Wi-Fi connection to the Wi-Fi router 104 using the SSID and the passphrase set up by the Web application 103 and switches the connection path to the Internet from the smartphone 102 being subjected to Wi-Fi tethering (in other words, a time-limited access point) to the Wi-Fi router 104 to be finally used. Subsequently, the Wi-Fi tethering function of the smartphone 102 becomes unnecessary and is therefore stopped.

Next, the processing procedure by the IoT device 101 to establish a Wi-Fi connection to the smartphone 102 running Wi-Fi tethering in the processing phase shown in FIG. 1 will be described in detail.

In a Wi-Fi environment, in order for the IoT device 101 as an STA to connect to an access point, the IoT device 101 needs an SSID and a passphrase of the access point. In the Wi-Fi tethering function, an arbitrary SSID and passphrase can be set. In consideration thereof, in the present example, a code sequence generated by a common code sequence generator is used to utilize a mechanism for sharing an SSID and a passphrase between the IoT device 101 and the smartphone 102.

For example, an M-sequence code generator that generates a type of a PN (Pseudo-Noise) code is used as the code sequence generator and an SSID and a passphrase are segmented from a generated code sequence to be utilized. A PN code sequence generator is a signal processor which, when given an initial value, generates a long value based on the initial value. While a pseudorandom value is output from the code sequence generator, from a same initial value, a fixed number based on the initial value is inevitably output. In addition, there is a characteristic that the output value is periodic and, during a unit period, a same value is not repeated or an autocorrelation value that indicates a degree of similarity is sufficiently small.

Therefore, when having a code sequence generator with a same configuration, a same code sequence is output if a same initial value is input. On the other hand, there is a characteristic that, since the output value is a long pseudorandom value, looking at the output value alone does not reveal a configuration of the code sequence generator used and an original initial value cannot be estimated.

Figure 4:
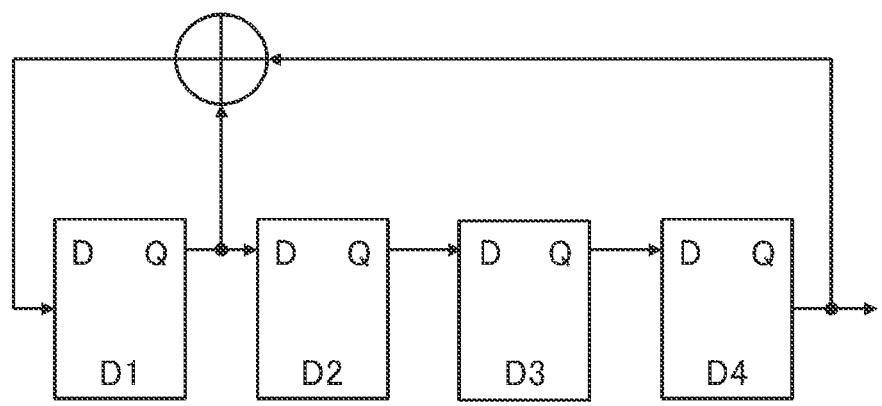
FIG. 4 is a diagram showing a configuration example of an M-sequence code generator.

FIG. 4 shows a configuration example of an M-sequence code generator. The illustrated M-sequence code generator is constituted by a shift register with tapped feedback. A pseudorandom code sequence is generated by setting an initial value to an M-sequence and subsequently performing a bit shift and an XOR (exclusive OR) operation of a feedback signal for each clock. It should be noted that the M-sequence code generator shown in FIG. 4 has a 4-bit configuration, with one period being $2^4-1=15$ bits.

In the present example, a dedicated application (for operation control of a time-limited access point) of the smartphone 102 and software for Internet connection setup (or for time-limited access point retrieval) of the IoT device 101 are equipped with M-sequence code generators with a same configuration (for example, the software is embedded software). In addition, a same initial value is shared by the smartphone 102 and the IoT device 101 and input to the M-sequence code generators so that a same code sequence is obtained.

There are various conceivable methods of sharing the same initial value between the smartphone 102 and the IoT device 101. In the present example, it is assumed that the same initial value is respectively embedded in the dedicated application of the smartphone 102 and the Internet connection setup software of the IoT device 101. For example, by designating product information or the like of the IoT device 101 from an application download site such as Google Play or Apple Store, the smartphone 102 can install an application which is for Internet connection setup of the IoT device 101 and in which the same initial value is embedded.

Figure 5:
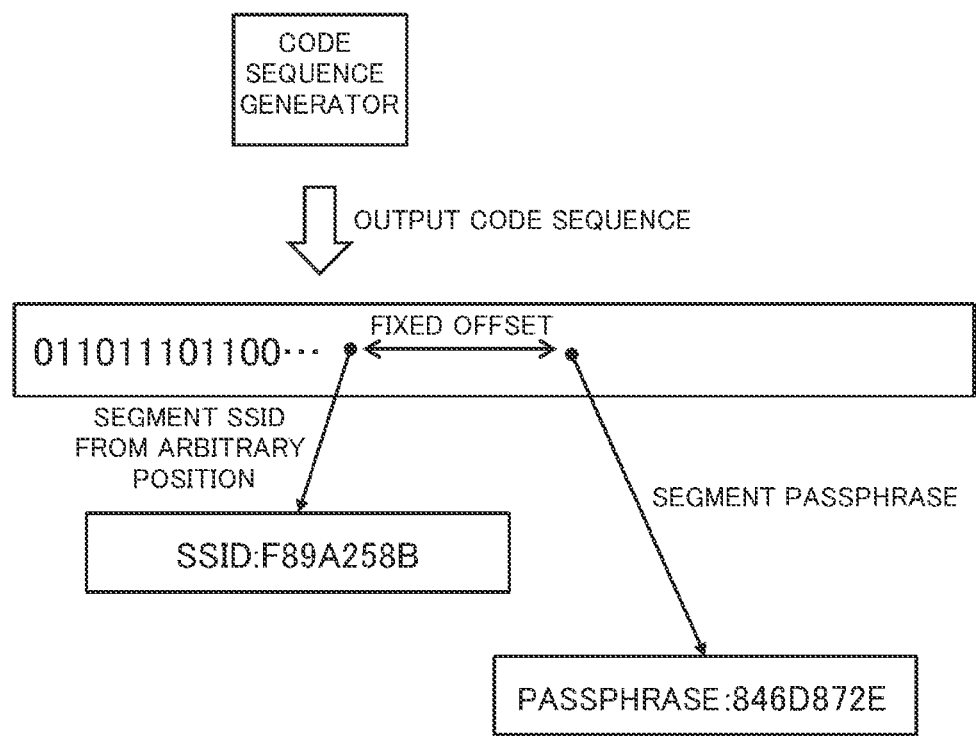
FIG. 5 is a diagram showing a mechanism of segmenting an SSID and a passphrase from a code sequence by a smartphone.

As an operation of the dedicated application, the smartphone 102 inputs the embedded initial value to the M-sequence code generator that is in common with the IoT device 101 and generates a long code sequence. Next, a code sequence to be used as an SSID is segmented from an arbitrary position on the code sequence and, further, a passphrase is segmented from a fixed offset position using the position where the SSID had been segmented as a reference (refer to FIG. 5).

Subsequently, as a next operation of the dedicated application, when the smartphone 102 starts the Wi-Fi tethering function, the smartphone 102 broadcasts a beacon signal at a predetermined period as a time-limited access point. The SSID created as explained above is described in the beacon signal.

On the other hand, as an operation of the Internet connection setup software, the IoT device 101 inputs the embedded initial value to the M-sequence code generator that is in common with the smartphone 102 and generates a same code sequence. Alternatively, the code sequence itself may be embedded in the software.

When not connected to an access point, the IoT device 101 scans the beacon signal to recognize an SSID of an access point within a reception range. It is assumed that beacon signals are to also arrive at the IoT device 101 from nearby access points (not illustrated) other than the smartphone 102 activating Wi-Fi tethering. In the present example, the IoT device 101 calculates autocorrelation between the code sequence described above and an SSID acquired from a received beacon signal to check whether or not the SSID partially matches the code sequence.

Figure 6:
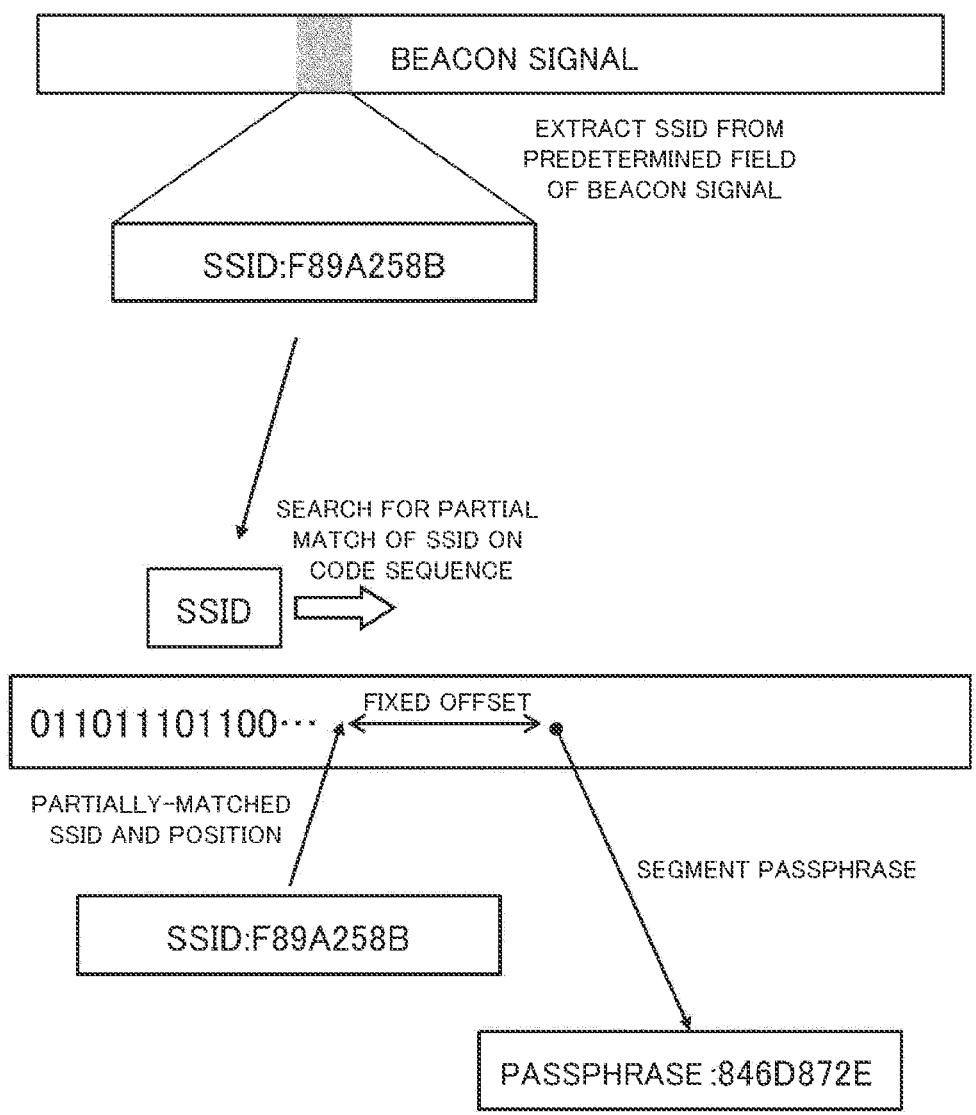
FIG. 6 is a diagram showing a mechanism of scanning an SSID that partially matches a code sequence and segmenting a passphrase by an IoT device.

At this point, when an SSID matching the code sequence is found, a transmission source of the beacon signal can be identified as the smartphone 102 currently operating as a time-limited access point (or the smartphone 102 for Internet connection setup). In addition, the IoT device 101 segments a passphrase from a fixed offset position using a position matching the SSID as a reference (refer to FIG. 6). Next, using the SSID that partially matches the code sequence and the passphrase having been segmented from the code sequence, the IoT device 101 makes a connection request to the smartphone 102 as a time-limited access point.

When a Wi-Fi connection to the smartphone 102 is established, the IoT device 101 obtains a time-limited connection path to the Internet. Subsequently, with respect to the IoT device 101, the Web application 103 running on the personal computer performs setup of setup information (specifically, an SSID and a passphrase or the like of the Wi-Fi router 104) necessary to establish a Wi-Fi connection to the Wi-Fi router 104.

Once a connection setup to the Wi-Fi router 104 is completed, based on setup contents thereof, the IoT device 104 switches to connection to the Wi-Fi router 104 to be finally used and, at the same time, disconnects the Wi-Fi connection to the smartphone 102 as a time-limited access point. In addition, upon receiving a disconnection request from the IoT device 101, the smartphone 102 ends Wi-Fi tethering.

Figure 7:
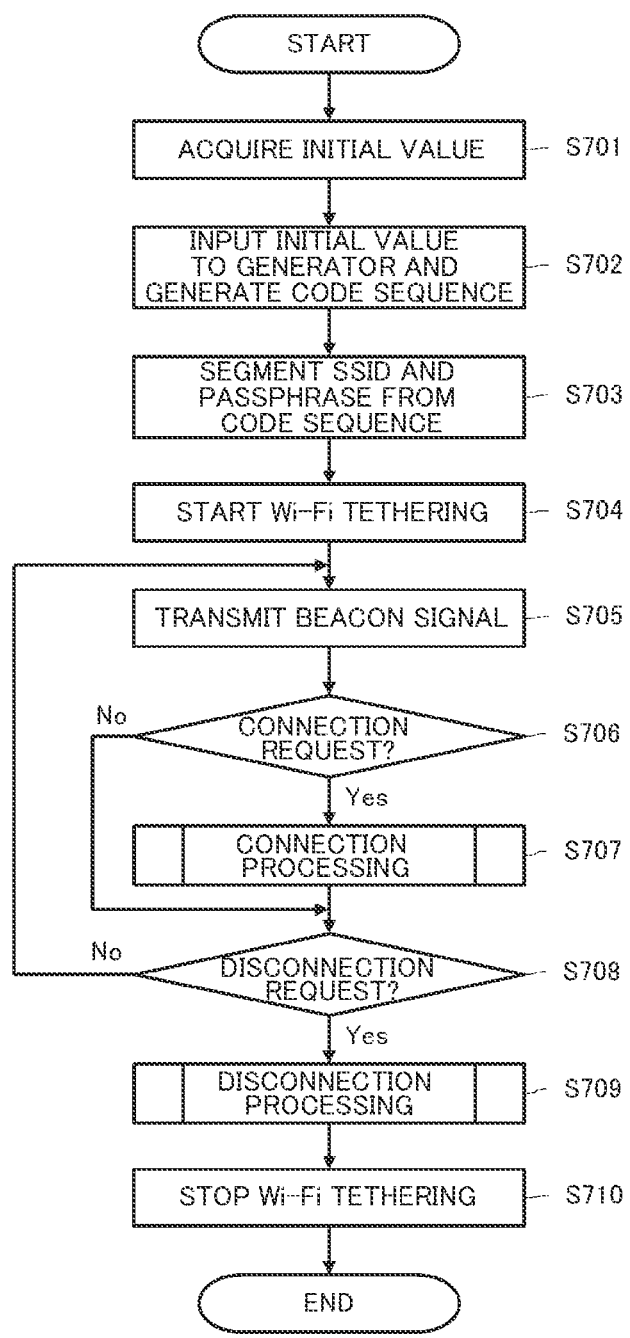
FIG. 7 is a flow chart showing a processing procedure that is executed by a smartphone 102 when performing an Internet connection setup of an IoT device 101.

FIG. 7 shows, in a flow chart format, a processing procedure that is executed by the smartphone 102 when performing an Internet connection setup of the IoT device 101. Specifically, the processing procedure is performed by installing a dedicated application for an Internet connection setup of the IoT device 101 on the smartphone 102.

The smartphone 102 first acquires an initial value (step S701). In the present example, an initial value embedded in the dedicated application is acquired.

Next, the smartphone 102 inputs the initial value into a code sequence generator provided in the dedicated application and generates a long code sequence (step S702).

Next, the smartphone 102 segments a code sequence to be used as an SSID from an arbitrary position of the code sequence and, further, segments a passphrase from a fixed offset position using the position where the SSID had been segmented as a reference (step S703).

In addition, the smartphone 102 starts a Wi-Fi tethering function (step S704) and, at each predetermined period, transmits a beacon signal including the SSID (step S705).

When the smartphone 102 receives a connection request from a terminal station while operating as an access point due to Wi-Fi tethering (Yes in step S706), the smartphone 102 performs connection processing (step S707).

In this case, it is assumed that a connection request is made from the IoT device 101 to be an object of an Internet connection setup to the smartphone 102 being subjected to Wi-Fi tethering. When a connection to the smartphone 102 being subjected to Wi-Fi tethering is established, the IoT device 101 obtains a connection path to the Internet in a time-limited manner. In addition, the IoT device 101 disconnects the connection to the smartphone 102 by switching the connection path to the Internet to the Wi-Fi router 104 to be finally used.

When the smartphone 102 receives a disconnection request from a terminal station (the IoT device 101) currently in a Wi-Fi connection (Yes in step S708), the smartphone 102 performs disconnection processing (step S709).

Subsequently, the smartphone 102 stops the Wi-Fi tethering function (step S710) and ends the present processing. By ending the present processing, the dedicated application running on the smartphone 102 also ends.

Figure 8:
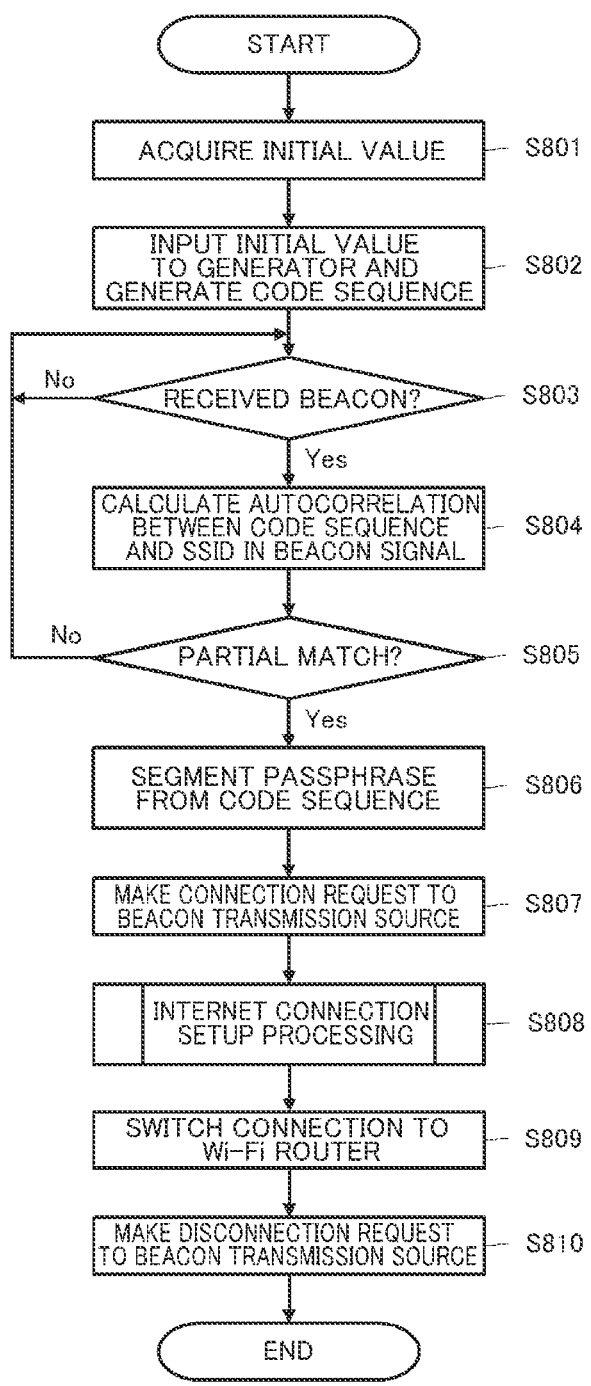
FIG. 8 is a flow chart showing a processing procedure that is executed by the IoT device 101 for performing an Internet connection setup.

FIG. 8 shows, in a flow chart format, a processing procedure that is executed by the IoT device 101 for performing an Internet connection setup. Specifically, the processing procedure is performed by the software for an Internet connection setup (or for time-limited access point retrieval) of the IoT device 101.

The IoT device 101 first acquires an initial value (step S801). In the present example, an initial value embedded in the software of the IoT device 101 is acquired. Next, the IoT device 101 inputs the initial value into a code sequence generator provided in the software and generates a long code sequence (step S802). However, by embedding a code sequence generated by inputting a predetermined initial value to the code sequence generator in the software, processing of steps S801 and S802 can be replaced with processing for reading the code sequence from the software.

Next, the IoT device 101 awaits reception of a beacon signal from an access point (step S803). In this case, it is assumed that the IoT device 101 is to receive a beacon signal from the smartphone 102 operating as an access point in a time-limited manner due to a Wi-Fi tethering function in order to perform an Internet connection setup.

In addition, upon receiving a beacon signal (Yes in step S803), the IoT device 101 calculates autocorrelation between the code sequence generated in step S802 and an SSID described in the beacon signal (step S804) and checks whether or not the SSID described in the beacon signal partially matches the code sequence (step S805).

When the SSID described in the beacon signal does not partially match the code sequence (No in step S805), the IoT device 101 returns to step S803 to continuously await reception of a beacon signal.

On the other hand, when the SSID described in the beacon signal partially matches the code sequence (Yes in step S805), a transmission source of the beacon signal can be identified as the smartphone 102 currently operating as a time-limited access point (or the smartphone 102 for Internet connection setup). In addition, the IoT device 101 segments a passphrase from a fixed offset position using a position matching the SSID as a reference (step S806).

Next, using the SSID that partially matches the code sequence and the passphrase having been segmented from the code sequence, the IoT device 101 makes a connection request to the transmission source of the beacon signal or, in other words, the smartphone 102 as a time-limited access point (step S807).

In this case, for the sake of brevity, it is assumed that the connection request enables the IoT device 101 to successfully establish a Wi-Fi connection to the smartphone 102 and obtain a time-limited connection path to the Internet.

Subsequently, with respect to the IoT device 101, the Web application 103 running on the personal computer performs, via the Internet (the smartphone 102), setup of setup information (specifically, an SSID and a passphrase or the like of the Wi-Fi router 104) necessary to establish a Wi-Fi connection to the Wi-Fi router 104 (step S808).

Once a connection setup to the Wi-Fi router 104 is completed, based on setup contents thereof, the IoT device 101 switches to a connection to the Wi-Fi router 104 to be finally used (step S809).

In addition, the IoT device 101 requests the smartphone 102 to disconnect the Wi-Fi connection (step S810) and ends the present processing. By ending the present processing, the software running on the IoT device 101 also ends. In response to the connection request, the smartphone 102 performs disconnection processing of the Wi-Fi connection to the IoT device 101 and, further, stops the Wi-Fi tethering function (described earlier).

As described earlier, in the first example, an Internet connection setup of an IoT device is performed via the Internet from a Web application or the like. The IoT device must be connected to the Internet in order to enable operations from the Web application. In consideration thereof, a time-limited access point is provided using the Wi-Fi tethering function of a smartphone to temporarily connect the IoT device to the Internet and enable operations necessary for an Internet connection setup to be performed with respect to the IoT device from the Web application.

Subsequently, the IoT device establishes a Wi-Fi connection to a nearest Wi-Fi router based on the connection setup and becomes constantly connected to the Internet via the Wi-Fi router. In addition, after the IoT device is connected to the Wi-Fi router, since the time-limited access point is no longer necessary, the tethering function of the smartphone can be stopped.

While an M-sequence code is assumed to be used as a PN code sequence in the description given above, a processing procedure similar to that described above can be realized even when another code sequence such as a Gold code or a Walsh code is used. While every code has different characteristics including autocorrelation characteristics, a disadvantage caused by a failed attempt by the IoT device 101 to connect to a time-limited access point is minor. Therefore, the IoT device 101 may attempt to establish connections with respect to all SSIDs of which an autocorrelation value is higher than a threshold and discover an access point to which a connection is successfully established.

In addition, there are various methods of determining a position where a passphrase is to be segmented from a code sequence. A passphrase may be segmented from an offset position (which may be a position immediately following an SSID) that is in common between the IoT device 101 and the smartphone 102 using a position where the SSID had been segmented as a reference, or a code sequence generator with a different configuration may be prepared and a portion of a segmentation position having been shifted by a same amount as the segmentation of the SSID as counted from an initial value may be adopted as the passphrase. Determining a segmentation method of a passphrase using on a segmentation position of an SSID as a reference enables a passphrase to be determined by a variety of other methods.

In addition, while an example has been described above in which, after the IoT device 101 successfully connects to the Internet via the smartphone 102 as a time-limited access point, a connection setup to the Wi-Fi router 104 is performed using the Web application 104 that runs on a PC or the like, the connection setup to the Wi-Fi router 104 can also be performed using the smartphone 102 that provides Wi-Fi tethering.

Second Example

In the first example, at a stage of connecting an IoT device to a time-limited access point, a code sequence is generated using an initial value that is respectively embedded in a dedicated application of the smartphone 102 and the Internet connection setup software of the IoT device 101. In this case, given that a dedicated application of the smartphone 102 is to be distributed for each product type of the IoT device 101, a common initial value is to be used by at least a plurality of IoT devices of a same product type.

In contrast, in a second example, a code sequence is to be generated using an initial value that is unique to each product (in other words, each individual piece) of an IoT device. Using a unique initial value for each product enables security strength to be increased as compared to a case where a common initial value is used.

Specifically, as an initial value unique to each product, a product serial number that is assigned to each product by a manufacturer is used. A product serial number is used by the manufacturer in order to manage users, prevent counterfeiting of products, and the like. In addition, a product serial number may also be referred to when a problem such as an incident or an accident related to the product occurs. Generally, a product serial number is a continuous string of numbers from beginning to end and a unique number is assigned to each product.

There are various methods of informing a user of the smartphone 102 to be used for an Internet connection setup of a product serial number of the IoT device 101. Usually, the product serial number is described in printed matter bundled with a package of an IoT device product or a sticker on which the product serial number is printed is affixed to a main body of the IoT device product.

A user operating the smartphone 102 may input a product serial number read from printed matter or a sticker to a dedicated application using a UI (User Interface) such as a touch panel or a speech recognition function of the smartphone 102. In addition, when the product serial number is provided as graphic information such as a QR code (registered trademark) or a barcode instead of a character string, the product serial number can be input to the dedicated application using a barcode reader function or the like that runs on the smartphone 102.

Furthermore, when performing an Internet connection setup of the IoT device 101, the smartphone 102 generates a code sequence with the code sequence generator using the product serial number input by the user as an initial value, and once an SSID and a passcode are segmented from the code sequence, the smartphone 102 starts a Wi-Fi tethering function and operates as a (time-limited) application.

In addition, it is assumed that the product serial number is stored in a non-volatile memory in the IoT device 101. Therefore, since the Internet connection setup software of the IoT device 101 uses the product serial number read from the internal non-volatile memory as an initial value of the code sequence generator to generate a same code sequence as the smartphone 102, a connection to the smartphone 102 being subjected to Wi-Fi tethering can be established.

Figure 9:
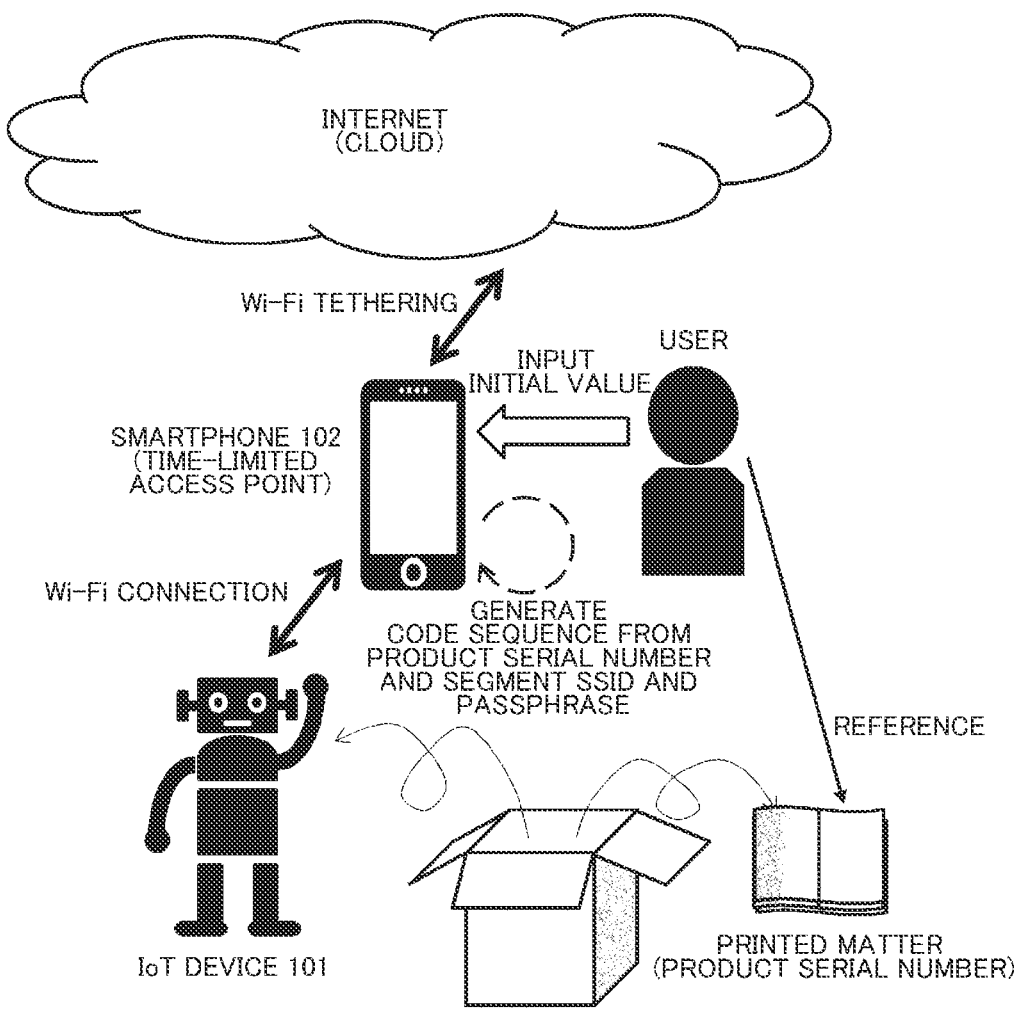
FIG. 9 is a diagram showing a stage in which an IoT device is connected to a time-limited access point in a second example.

FIG. 9 shows a stage in which an IoT device is connected to a time-limited access point in the second example.

In the second example, the processing procedure that is executed by the smartphone 102 when performing an Internet connection setup of the IoT device 101 is as shown in FIG. 7 in a similar manner to the first example. However, in step S701, processing is to be performed in which a user inputs a product serial number of the IoT device 101 via a UI function of the smartphone 102 or the user reads the product serial number from a QR code (registered trademark) using a barcode reader.

In addition, in the second example, the processing procedure that is executed by the IoT device 101 for performing an Internet connection setup is also as shown in FIG. 8 in a similar manner to the first example. However, in step S801, processing is to be performed in which the Internet connection setup software reads the product serial number from a non-volatile memory inside the device.

It should be noted that, in the present example, a character string partially segmented from the product serial number may be used as the initial value or the initial value may be generated by applying the product serial number to a predetermined arithmetic operation. In addition, information that is guaranteed to be unique to each product other than a product serial number can also be used as the initial value. Even in these cases, it is assumed that the IoT device 101 stores the initial value in an internal non-volatile memory. Furthermore, the user of the smartphone 102 may be informed of the initial value by a similar method to the product serial number.

Third Example

With the second example, since an initial value unique to each product such as a product serial number is used in a stage of connecting an IoT device to a time-limited access point, security strength is expected to increase as compared to the first example. However, since a user must perform an operation of inputting an initial value (a product serial number) of each IoT device 101 with respect to the smartphone 102, there is a concern that this may be perceived as a hassle.

In a third example, a character string unique to each product such as a product serial number is used as an initial value in a similar manner to the second example. However, in the third example, the operation by the user of inputting a product serial number to the smartphone 102 is eliminated by having the cloud (or a server on the Internet) distribute the product serial number to the smartphone 102.

The third example is premised on the manufacturer of the IoT device product adopting a mode of sales in which an individual IoT device product is directly sold to a user via the manufacturer's site on the Internet.

In such a mode of sales, the manufacturer is capable of associating a user with an IoT device product purchased by the user. The manufacturer also uses the product serial number for the purpose of managing users by the manufacturer. For example, on the manufacturer's site, a database is managed which associates user identification information of a user having purchased an IoT device product with a product serial number of the purchased product.

In addition, when a user registers a purchased IoT device product to the manufacturer's site using an application of the smartphone 102, the manufacturer's site can notify the smartphone 102 via the Internet of the product serial number associated with a user ID of the user. For example, a product registration service can be implemented using a Web API (Application Program Interface). When performing an Internet connection setup of the IoT device 101, the smartphone 102 segments an SSID and a passphrase from a code sequence generated using the product serial number notified upon product registration, starts a Wi-Fi tethering function, and operates as a (time-limited) application.

Figure 10:
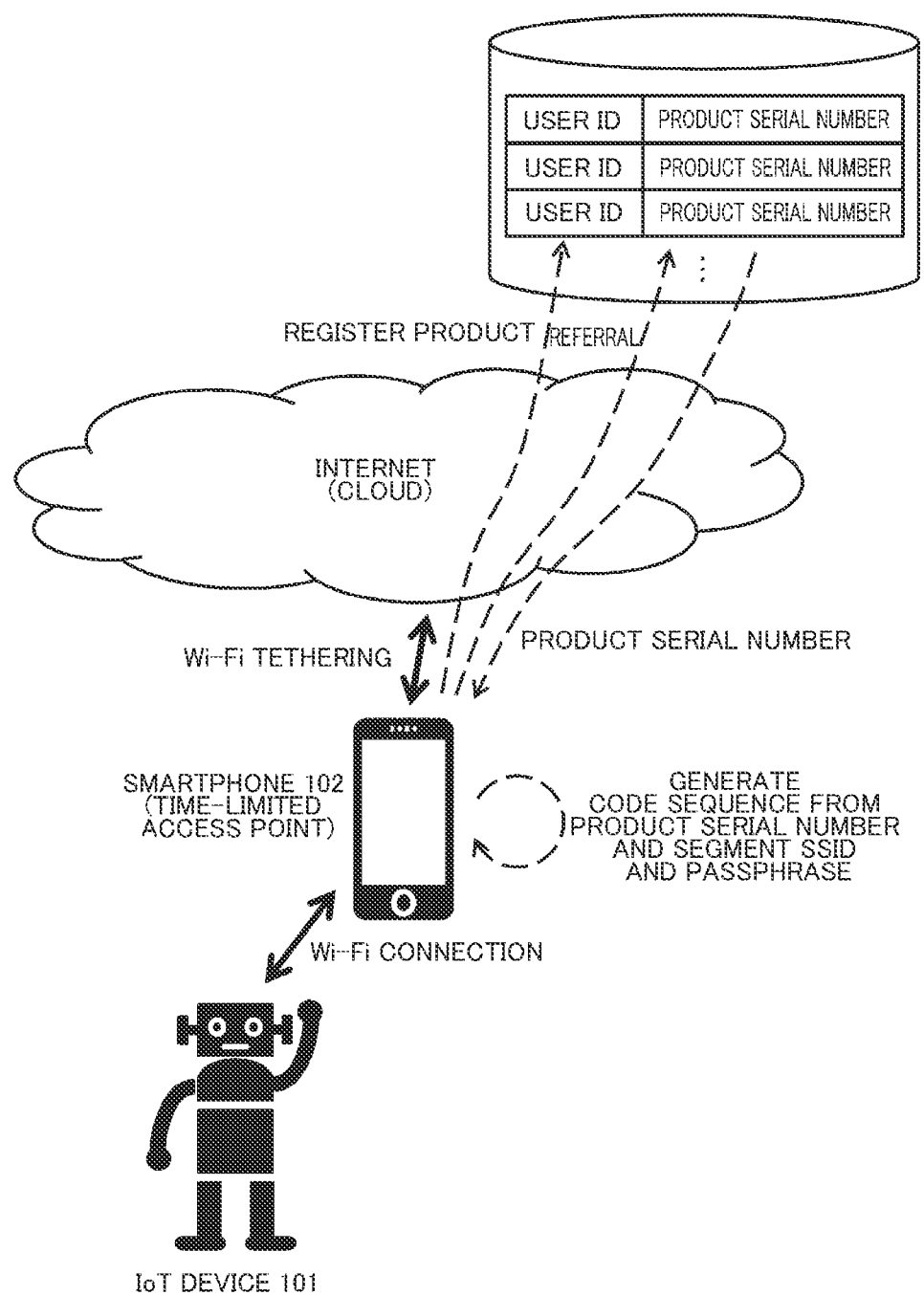
FIG. 10 is a diagram showing a stage in which an IoT device is connected to a time-limited access point in a third example.

FIG. 10 shows a stage in which an IoT device is connected to a time-limited access point in the third example.

In the third example, the processing procedure that is executed by the IoT device 101 for performing an Internet connection setup is exactly the same as that in the second example. In other words, the IoT device 101 executes the processing procedure for performing an Internet connection setup using a product serial number read from an internal non-volatile memory as an initial value.

In addition, while the processing procedure executed by the smartphone 102 when performing an Internet connection setup of the IoT device 101 in the third example is as shown in FIG. 7, in step S701, processing for acquiring a product serial number having been notified from the manufacturer's site or the like upon product registration of the IoT device 101 is to be performed.

Figure 11:
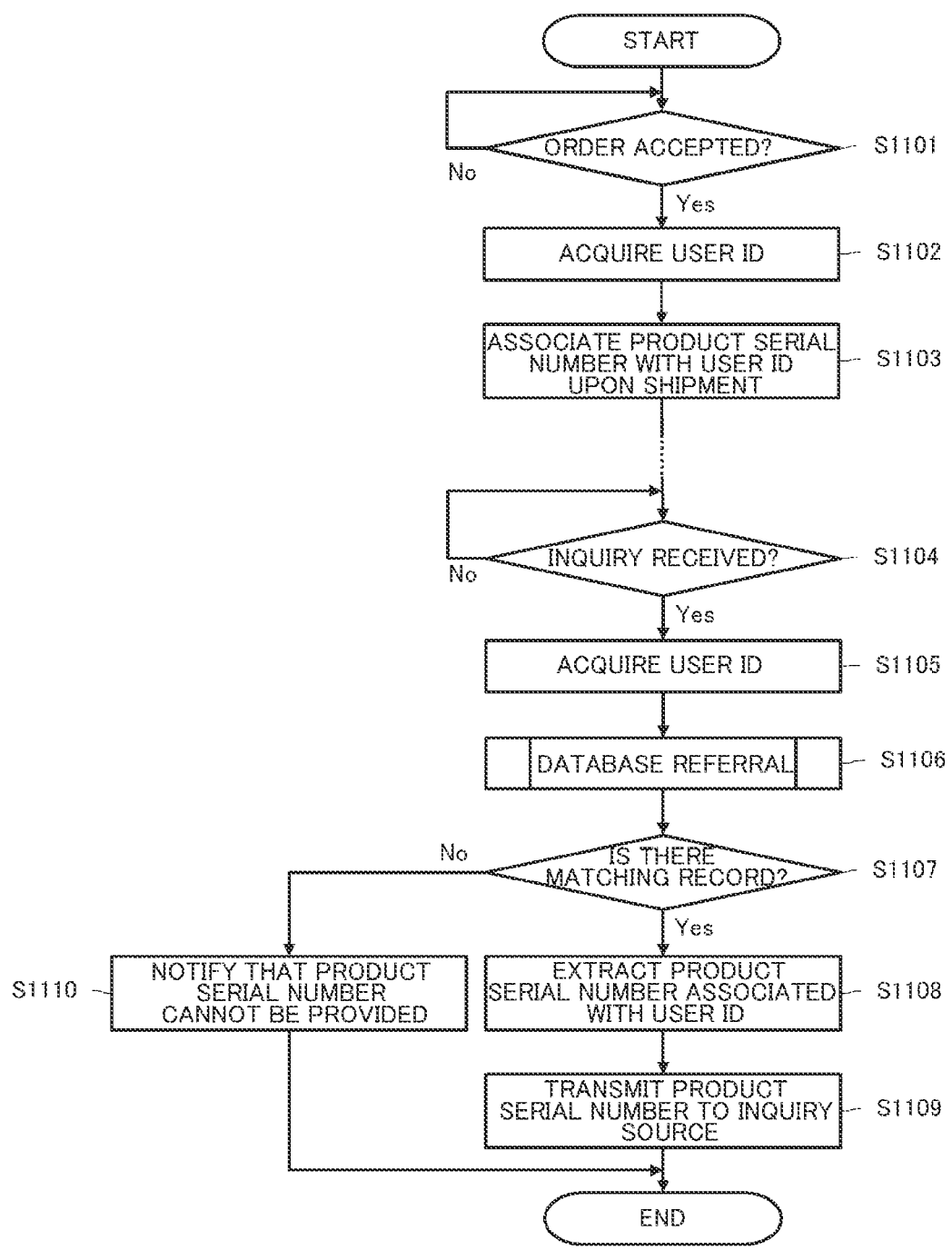
FIG. 11 is a flow chart showing a processing procedure (third example) that is executed by a manufacturer's site when performing an Internet connection setup of the IoT device 101.

FIG. 11 shows, in a flow chart format, a processing procedure that is executed by a manufacturer's site (or the cloud) when performing an Internet connection setup of the IoT device 101 in the third example.

When the manufacturer's site accepts an order for an IoT device product from a user (Yes in step S1101), the manufacturer's site acquires a user ID of the user (step S1102) and, upon shipping, registers a product serial number of the shipped IoT device in association with the user ID in a database (step S1103).

Subsequently, when an inquiry is made from the smartphone 102 of the user to which the IoT device product had been sold (Yes in step S1104), the manufacturer's site acquires a user ID of the inquiry source (step S1105) and refers to the database (step S1106).

At this point, in the unlikely event that a record with a matching user ID is not found in the database (No in step S1107), the manufacturer's site notifies the smartphone 102 of the request source that a product serial number as an initial value cannot be transmitted (step S1110) and ends the present processing.

On the other hand, when a record with a matching user ID is found in the database (Yes in step S1107), the manufacturer's site extracts a product serial number associated with the user ID from the record (step S1108), transmits the product serial number to the smartphone 102 of the inquiry source (step S1109), and ends the present processing.

Fourth Example

In the third example, since the cloud provides a product serial number to be used as an initial value of a code sequence generator, an input operation of the initial value with respect to the smartphone 102 by a user is omitted and, at the same time, an increase in security strength is expected. In a fourth example, the cloud further generates a code sequence based on a corresponding product serial number, performs processing for segmenting an SSID and a passphrase from the code sequence, and provides the smartphone 102 with the SSID and the passphrase.

Therefore, according to the fourth example, a processing load on the smartphone 102 of performing an arithmetic operation for generating a code sequence and segmenting an SSID and a passphrase from the code sequence is reduced. In addition, latitude to launch a security attack by analyzing an application of the smartphone 102 and assessing a code sequence to be generated can be eliminated.

In a similar manner to the third example, the fourth example is also premised on the manufacturer of the IoT device product adopting a mode of sales in which an individual IoT device product is directly sold to a user via the manufacturer's site on the Internet. In addition, the manufacturer manages a user in association with an IoT device product purchased by the user.

In addition, when a user registers a purchased IoT device product using an application of the smartphone 102, the manufacturer's site segments an SSID and a passcode from a code sequence generated using the product serial number associated with the user ID as an initial value and transmits the SSID and the passcode to the smartphone 102. For example, the smartphone 102 may request, via a Web API, the manufacturer's site to provide an SSID and a passphrase. The smartphone 102 starts a Wi-Fi tethering function using the SSID and the passcode received from the manufacturer's site as-is and operates as a (time-limited) access point.

Figure 12:
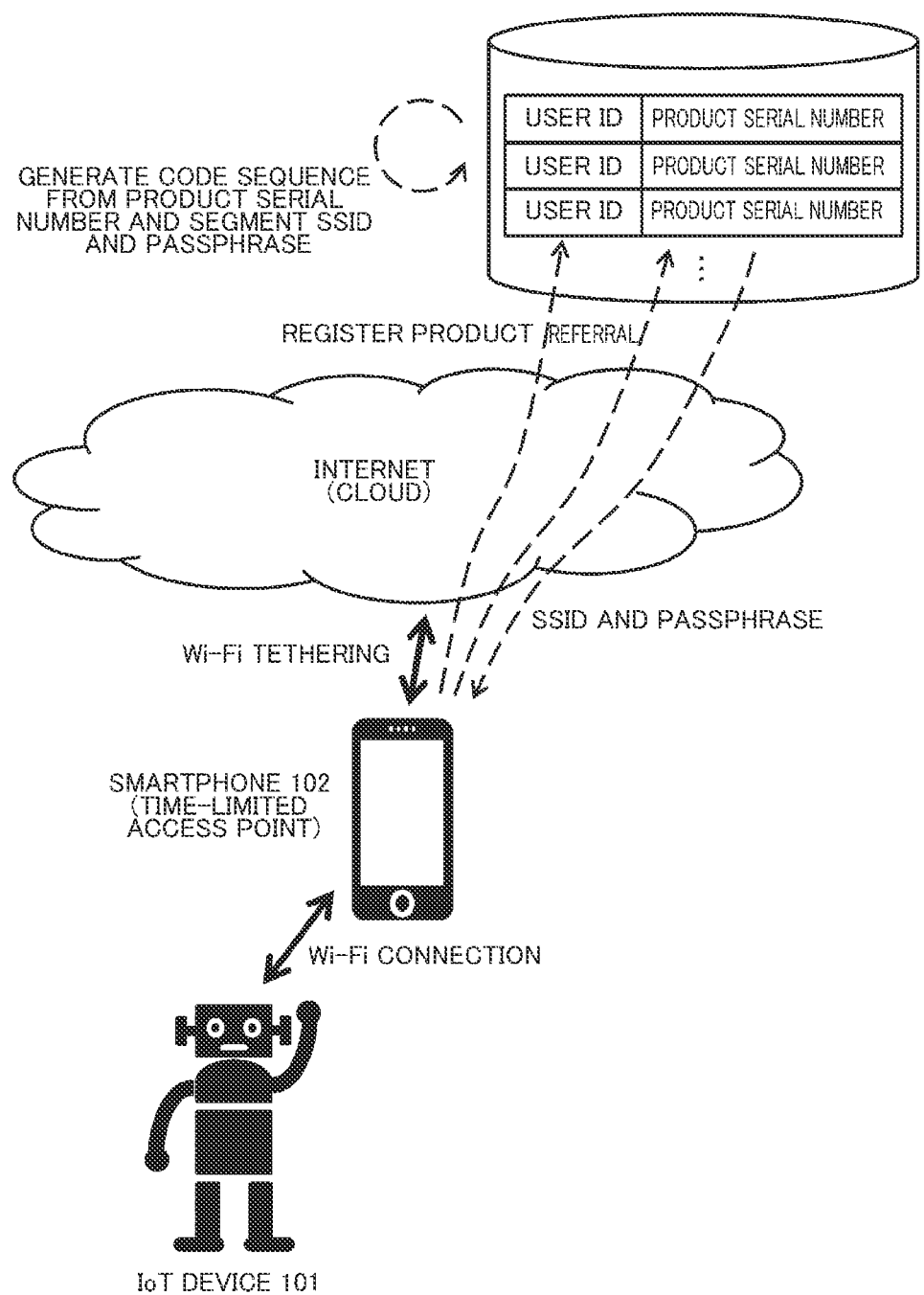
FIG. 12 is a diagram showing a stage in which an IoT device is connected to a time-limited access point in a fourth example.

FIG. 12 shows a stage in which an IoT device is connected to a time-limited access point in the fourth example.

In the fourth example, the processing procedure that is executed by the IoT device 101 for performing an Internet connection setup is exactly the same as that in the second example. In other words, the IoT device 101 executes the processing procedure for performing an Internet connection setup using a product serial number read from an internal non-volatile memory as an initial value.

In addition, in the fourth example, in the processing procedure executed by the smartphone 102 when performing an Internet connection setup of the IoT device 101, processing of steps S701 to S703 in the flow chart shown in FIG. 7 for acquiring an initial value, generating a code sequence with a code sequence generator, and segmenting an SSID and a passphrase from the code sequence is to be replaced with processing for receiving an SSID and a passphrase for Wi-Fi tethering from the manufacturer's site.

Figure 13:
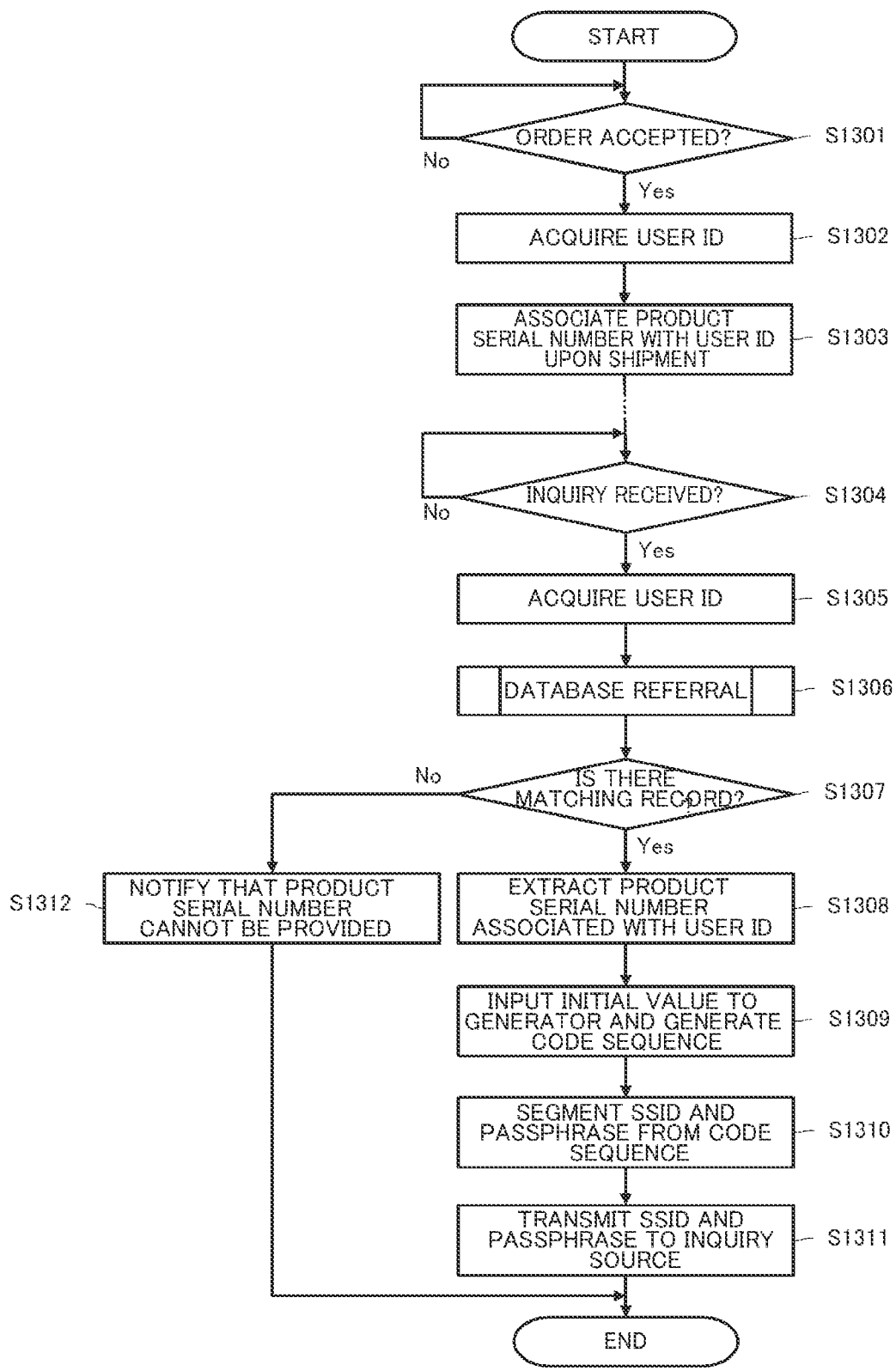
FIG. 13 is a flow chart showing a processing procedure (fourth example) that is executed by a manufacturer's site when performing an Internet connection setup of the IoT device 101.

FIG. 13 shows, in a flow chart format, a processing procedure that is executed by a manufacturer's site (or the cloud) when performing an Internet connection setup of the IoT device 101 in the fourth example.

When the manufacturer's site accepts an order for an IoT device product from a user (Yes in step S1301), the manufacturer's site acquires a user ID of the user (step S1302) and, upon shipping, registers a product serial number of the shipped IoT device in association with the user ID in a database (step S1303).

Subsequently, when an inquiry is made from the smartphone 102 of the user to which the IoT device product had been sold (Yes in step S1304), the manufacturer's site acquires a user ID of the inquiry source (step S1305) and refers to the database (step S1306).

At this point, in the unlikely event that a record with a matching user ID is not found in the database (No in step S1307), the manufacturer's site notifies the smartphone 102 of the request source that a product serial number as an initial value cannot be transmitted (step S1312) and ends the present processing.

On the other hand, when a record with a matching user ID is found in the database (Yes in step S1307), the manufacturer's site extracts a product serial number associated with the user ID from the record (step S1308).

Next, the manufacturer's site inputs an initial value to a code sequence generator that is in common with the IoT device 101 and generates a long code sequence (step S1309), segments a code sequence to be used as an SSID from an arbitrary position of the code sequence and, further, segments a passphrase from a fixed offset position using the position where the SSID had been segmented as a reference (step S1310).

In addition, the manufacturer's site transmits the SSID and the passphrase to the smartphone 102 of an inquiry source (step S1311) and ends the present processing.

In the fourth example, a single manufacturer's site similarly performs a distribution service of an SSID and a passphrase with respect to a plurality of users (smartphones) to which an IoT device of a same product type has been sold. The manufacturer's site manages a product serial number of an IoT device product purchased by each user. Therefore, since the manufacturer's site generates a code sequence using a product serial number that is unique to each product as an initial value when a request is made via a Web API from the smartphone 102 of any user, a different SSID and a different passphrase can be provided for each IoT device product to be an object.

Fifth Example

In each of the first to fourth examples, an IoT device 101 first connects to a smartphone 102 being subjected to Wi-Fi tethering and, subsequently, a Web application 103 performs an Internet connection setup with respect to the IoT device 101. In these examples, a user is to perform an operation for the Internet connection setup on a PC that is running the Web application 103.

In contrast, in a fifth example, a Wi-Fi connection setup service installed in the cloud stores Wi-Fi connection setup information in association with a user account and communicates with the IoT device 101 to perform a Wi-Fi connection setup. Therefore, the user need no longer be troubled to operate the Web application 103.

Figure 14:
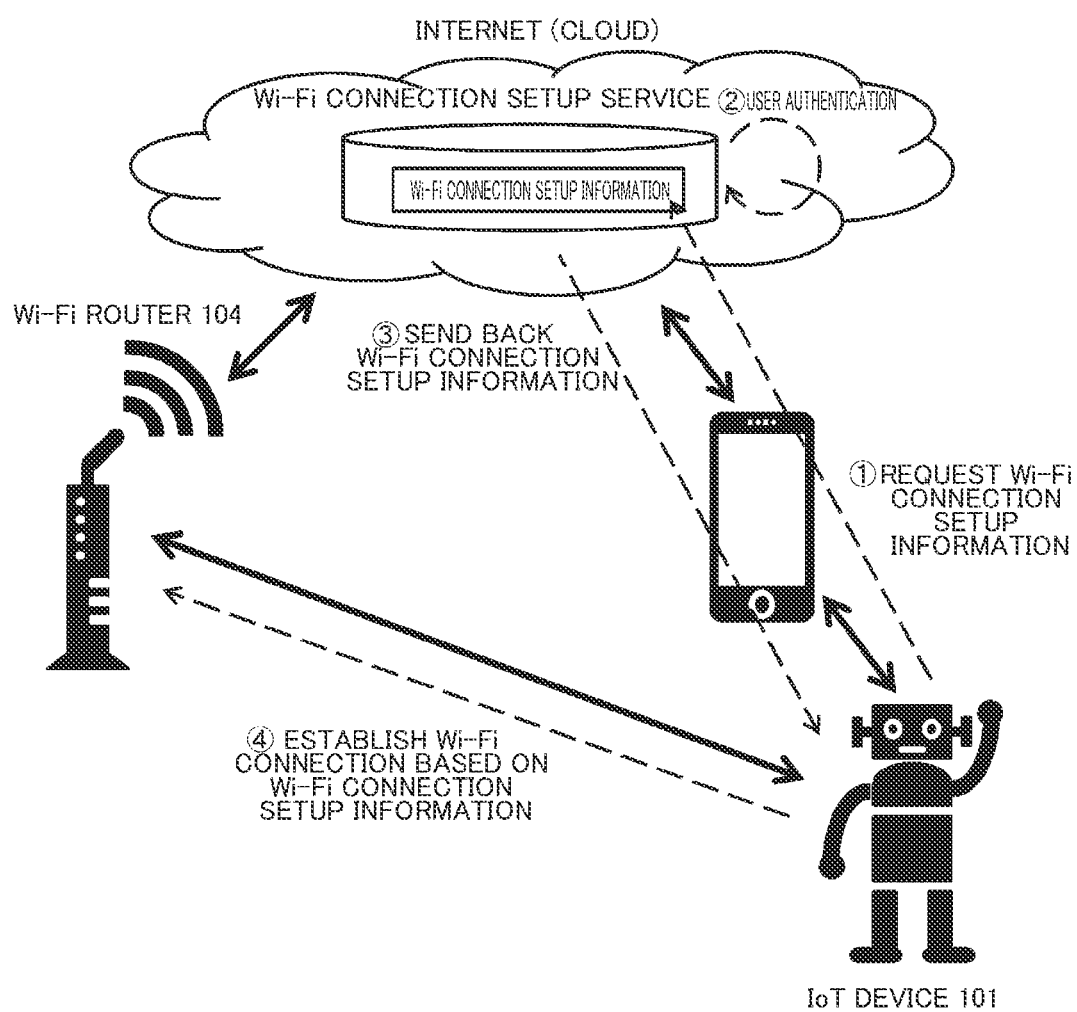
FIG. 14 is a diagram showing a stage in which an Internet connection setup is performed from the cloud to an IoT device in a fifth example.

FIG. 14 shows a stage in which an Internet connection setup is performed from the cloud to an IoT device in the fifth example.

After establishing a connection to a smartphone 102 being subjected to Wi-Fi tethering by any of the procedures according to the first to fourth examples, the IoT device 101 requests the Wi-Fi connection setup service in the cloud to provide Wi-Fi connection setup information to a Wi-Fi router 104. For example, the IoT device 101 can make this request via a Web API.

After performing user authentication in response to the request from the IoT device 101, the Wi-Fi connection setup service reads the Wi-Fi connection setup information stored in an account of the user and sends back the Wi-Fi connection setup information to the IoT device 101.

Subsequently, the IoT device 101 disconnects from the smartphone 102 being subjected to Wi-Fi tethering and, based on the Wi-Fi connection setup information acquired from the Wi-Fi connection setup service, connects to the Wi-Fi router 104 to be finally used.

In the fifth example, the processing procedure that is executed by the smartphone 102 when performing an Internet connection setup of the IoT device 101 may be the same as any of the first to fourth examples.

In addition, in the fifth example, the processing procedure that is executed by the IoT device 101 for performing an Internet connection setup is as shown in FIG. 8 in a similar manner to the first example. However, the operation of the IoT device 101 described with reference to FIG. 14 is mainly performed as processing of steps S808 and thereafter.

Sixth Example

Connecting a large number of IoT devices to the Internet in a factory or the like becomes a significant hassle when individually performing a Wi-Fi connection setup for each IoT device. In consideration thereof, in a sixth example, the Wi-Fi connection setup of each IoT device is automated on the basis of the processing procedure described in the first example.

Figure 15:
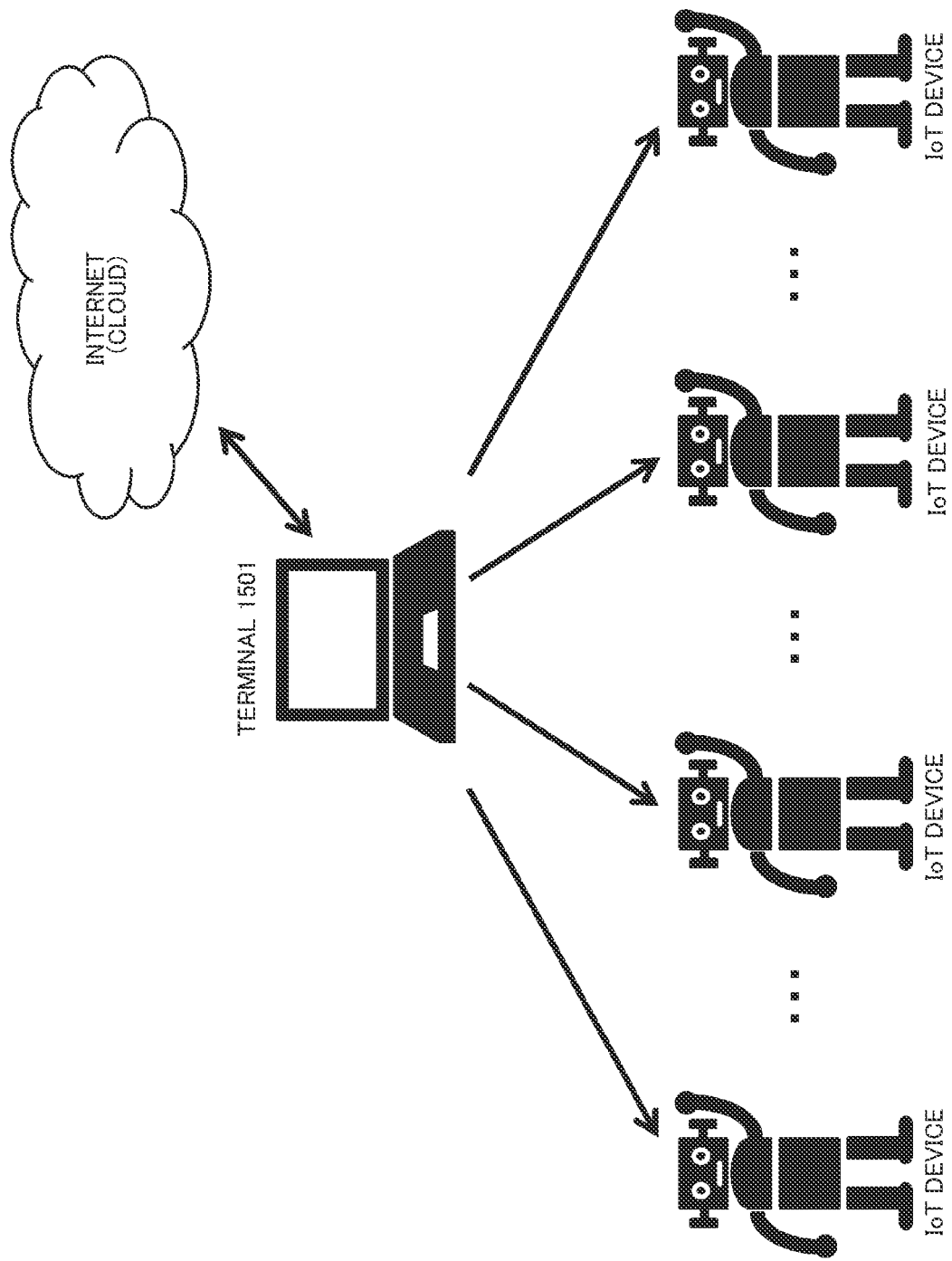
FIG. 15 is a diagram showing a stage in which an Internet connection setup is performed to a large number of IoT devices in a sixth example.

FIG. 15 shows a stage in which an Internet connection setup is performed with respect to a large number of IoT devices in the sixth example.

A terminal 1501 operates as a Wi-Fi router and provides a large number of IoT devices with an Internet connection by maintaining a connection path to the Internet (the cloud) based on a wired connection and, at the same time, providing an access point function using a Wi-Fi interface. The terminal 1501 may be installed with Linux (registered trademark).

The terminal 1501 performs processing for generating a PN sequence code with a common fixed value as an initial value in a similar manner to the smartphone 102 in the first example. In addition, after segmenting an SSID and a passphrase from the generated code sequence, the terminal 1501 starts an access point function and broadcasts a beacon signal including the SSID.

Each IoT device has a PN code generator with a same configuration as that of the terminal 1501 and generates a PN sequence code using the common fixed value as an initial value. In addition, the IoT device performs a beacon scan and, when an SSID exhibiting a high correlation with the generated sequence code is found, the IoT device segments a passphrase from the sequence code and attempts to connect to an access point of a beacon transmission source. In this manner, the IoT device automatically secures a connection path to the Internet without involving an operation by a user.

In addition, when the IoT device finds a plurality of access points having SSIDs that exhibit a high correlation with the generated sequence code as a result of the beacon scan, the IoT device preferentially connects to an access point of which reception signal power is high. By operating in this manner, even when a terminal that operates as a Wi-Fi router is newly installed, connections are automatically established in a distributed manner.

Finally, advantageous effects of the technique proposed in the present specification through the first to fifth examples will be summarized as follows.

(1) According to the technique proposed in the present specification, by simply starting a dedicated application of a smartphone or reading a QR code (registered trademark) using the dedicated application, an IoT device can be automatically connected to the Internet without involving any other operation by a user.

(2) Therefore, according to the technique proposed in the present specification, an IoT device without an input/output apparatus can be readily connected to the Internet using a smartphone.

(3) In addition, according to the technique disclosed in the present specification, an IoT device can be connected to the Internet even in an environment without a Wi-Fi access point.

INDUSTRIAL APPLICABILITY

The technique disclosed in the present specification has been heretofore described in detail with reference to a specific embodiment. However, it is obvious that various modifications and substitutions to the embodiment will occur to those skilled in the art without departing from the gist of the technique disclosed in the present specification.

The technique disclosed in the present specification enables a connection setup to the Internet (a Wi-Fi router) to be readily performed by being applied to various types of wireless devices without a display apparatus and an input apparatus such as autonomous sensors, autonomous robots, and IoT devices of various types. It is needless to say that the technique disclosed in the present specification can be similarly applied to information devices equipped with a display apparatus and an input apparatus such as smartphones, tablets, and personal computers to perform a connection setup to the Internet.

To summarize, the technique disclosed in the present specification has been described by way of exemplification and the contents of the description of the present specification should not be restrictively interpreted. The appended claims should be taken into consideration in order to determine the gist of the technique disclosed in the present specification.

The technique disclosed in the present specification can also be configured as follows.

(1) A communication apparatus including:
a first connecting unit configured to connect to a first device;
an acquiring unit configured to acquire, via the first device, setup information for connecting to a second device that operates as a router; and
a second connecting unit configured to connect to the second device based on the setup information.

(2) The communication apparatus according to (1) described above, wherein the first device is configured to temporarily operate as an access point, and the first connecting unit is configured to perform a connection request with respect to the access point as a terminal and connect to the first device.

(3) The communication apparatus according to (1) or (2) described above, wherein the first connecting unit is configured to acquire setup information for connecting to the first device based on a code sequence generated from a predetermined initial value using a predetermined code sequence generator.

(4) The communication apparatus according to claim 3) described above, including the code sequence generator that is in common with the first device, wherein the code sequence generator is configured to generate the code sequence based on the initial value that is shared with the first device.

(5) The communication apparatus according to (3) or (4) described above, wherein the first connecting unit is configured to
extract network identification information from a signal received from the first device,
segment network authentication information from a predetermined offset position using a position matching the network identification information on the code sequence as a reference, and
attempt to connect to the first device based on the network identification information and the network authentication information.

(6) The communication apparatus according to any one of (1) to (5) described above, wherein
the first connecting unit is configured to perform processing for disconnecting a connection to the first device in response to the acquiring unit acquiring the setup information or the second connecting unit establishing a connection to the second device.

(7) The communication apparatus according to any one of (1) to (6) described above, wherein
the first connecting unit is configured to connect to the first device being subjected to Wi-Fi tethering,
the acquiring unit is configured to acquire, via the Internet, the setup information for connecting to a Wi-Fi router, and
the second connecting unit is configured to connect to the Wi-Fi router as the second device.

(8) The communication apparatus according to any one of (1) to (7) described above, wherein
the acquiring unit is configured to acquire the setup information based on an operation from a third device via a network to which the first device is connected.

(9) The communication apparatus according to any one of (1) to (7) described above, wherein
the acquiring unit is configured to make a request for the setup information with respect to a predetermined service on a network to which the first device is connected.

(10) The communication apparatus according to (5) described above, wherein the first connecting unit is configured to, when detecting a plurality of devices transmitting a network identification signal that partially matches the code sequence, select any of the plurality of devices based on reception signal power.

(11) The communication apparatus according to any one of (3) to (5) described above, using the initial value of each product type assigned to the communication apparatus.

(12) The communication apparatus according to any one of (3) to (5) described above, using the initial value that is unique to each product assigned to the communication apparatus.

(13) The communication apparatus according to (12) described above, using a product serial number assigned to the communication apparatus as the initial value.

(14) A communication method including:
a first connection step of connecting to a first device;
a step of acquiring, via the first device, setup information for connecting to a second device that operates as a router; and
a second connection step of connecting to the second device based on the setup information.

(15) A communication apparatus including:
a generating unit configured to segment network identification information and network authentication information from a code sequence generated from a predetermined initial value using a predetermined code sequence generator;
a transmitting unit configured to transmit a signal including the network identification information to a fourth device; and
a connecting unit configured to connect to the fourth device in response to a connection request based on the network authentication information from the fourth device.

(15-1) The communication apparatus according to (15) described above, wherein the connecting unit has a tethering function and is configured to connect the fourth device to the Internet.

(15-2) The communication apparatus according to (15-1) described above, wherein
the connecting unit is configured to stop the tethering function in response to a disconnection request from the fourth device.

(16) The communication apparatus according to (15) described above, wherein the generating unit is configured to generate the code sequence from an initial value that is shared with the fourth device using the code sequence generator that is in common with the fourth device, segment the network identification information from an arbitrary location in the code sequence, and segment the network authentication information from a predetermined offset position using the network identification information as a reference.

(17) The communication apparatus according to (15) or (16) described above, wherein the generating unit is configured to generate the code sequence based on the initial value retained inside the communication apparatus.

(18) The communication apparatus according to (15) or (16) described above, further including an input unit on which a user performs an input operation, wherein the generating unit is configured to generate the code sequence based on the initial value input via the input unit.

(19) The communication apparatus according to (15) or (16) described above, further including a second connecting unit configured to connect to a network, wherein the generating unit is configured to generate the code sequence based on the initial value provided via the network.

(20) A communication method including:

a generation step of segmenting network identification information and network authentication information from a code sequence generated from a predetermined initial value using a predetermined code sequence generator;

a transmission step of transmitting a signal including the network identification information to a fourth device; and a connection step of connecting to the fourth device in response to a connection request based on the network authentication information from the fourth device.

REFERENCE SIGNS LIST

101 IoT device
102 Smartphone
103 Web application
104 Wi-Fi router

The invention claimed is:

1. A communication apparatus, comprising:
a processor configured to:
  acquire an initial value;
  generate a code sequence based on the initial value;
  receive a signal from a first device;
  extract network identification information from the signal;
  determine an offset position associated with the code sequence based on a position where the network identification information matches with the code sequence;
  segment, based on the offset position, network authentication information from the code sequence;
  connect to the first device based on each of the network identification information and the network authentication information;
  acquire, via the first device, setup information associated with a second device, wherein the second device operates as a router; and
  connect to the second device based on the setup information.

2. The communication apparatus according to claim 1, wherein
the first device temporarily operates as an access point, and
the processor is further configured to:
  output a connection request to the access point; and
  connect to the first device based on the outputted connection request.

3. The communication apparatus according to claim 1, wherein
the processor corresponds to a code sequence generator,
the code sequence generator is in common with the first device,
the communication apparatus and the first device share the initial value, and
the code sequence generator is configured to generate the code sequence based on the shared initial value.

4. The communication apparatus according to claim 1, wherein
the processor is further configured to execute a disconnection process based on at least one of:
  the acquisition of the setup information, or
  establishment of a connection to the second device, and
the disconnection process is executed to disconnect a connection to the first device.

5. The communication apparatus according to claim 1, wherein
the first device is subjected to Wi-Fi tethering,
the second device corresponds to a Wi-Fi router, and
the processor is further configured to:
  acquire, via Internet, the setup information associated with the Wi-Fi router; and
  connect to the Wi-Fi router based on the setup information.

6. The communication apparatus according to claim 1, wherein the processor is further configured to:
receive, via a network, an operation from a third device, wherein the first device is connected to the network; and
acquire the setup information based on the received operation.

7. The communication apparatus according to claim 1, wherein
the processor is further configured to output a request for the setup information associated with a determined service,
the first device is connected to a network, and
the determined service is on the network.

8. The communication apparatus according to claim 1, wherein the processor is further configured to:
detect that a plurality of devices transmits a network identification signal, wherein
  the plurality of devices includes the first device, and
  the network identification signal partially matches with the generated code sequence; and
select a third device of the plurality of devices based on each of:
  the detection that the plurality of devices transmits the network identification signal, and
  reception signal power associated with the network identification signal.

9. The communication apparatus according to claim 1, wherein
the communication apparatus is associated with a plurality of product types, and
the processor is further configured to generate the code sequence based on the initial value of each product type of the plurality of product types.

10. The communication apparatus according to claim 1, wherein
the communication apparatus is associated with a plurality of products, and the initial value is unique to each product of the plurality of products.

11. The communication apparatus according to claim 10, wherein
- each product of the plurality of products has a product serial number, and
- the initial value corresponds to the product serial number of each product of the plurality of products.

12. A communication method, comprising:
- acquiring an initial value;
- generating a code sequence based on the initial value;
- receiving a signal from a first device;
- extracting network identification information from the signal;
- determining an offset position associated with the code sequence based on a position where the network identification information matches with the code sequence;
- segmenting, based on the offset position, network authentication information from the code sequence;
- connecting to the first device based on each of the network identification information and the network authentication information;
- acquiring, via the first device, setup information associated with a second device, wherein the second device operates as a router; and
- connecting to the second device based on the setup information.

* * * * *